Patented Feb. 5, 1929.

1,700,960

UNITED STATES PATENT OFFICE.

ROBERT H. VAN SCHAACK, JR., OF EVANSTON, ILLINOIS, ASSIGNOR TO VAN SCHAACK BROS. CHEMICAL WORKS, OF CHICAGO, ILLINOIS, A CORPORATION OF ILLINOIS.

ARYL ALKYL ESTERS.

No Drawing.  Application filed September 14, 1927.  Serial No. 219,561.

My invention relates to a new and useful composition of matter comprising the mixed ester of an aromatic and a saturated aliphatic alcohol with a polycarboxylic acid.

An example of the invention is benzyl ethyl phthalate,

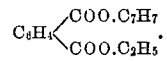

Containing two ester groupings, the compounds of this type are useful as solvents for pyroxylin. Having a relatively high boiling point, they are especially useful as plasticizers of lacquer films or as camphor substitutes in celluloid.

The various members of the class of compounds invented by me may be made by the reaction of one molecule of the polycarboxylic acid, preferably in the presence of a catalyst of esterification, with one molecule of each of the two alcohols whose radicals are desired as components of the finished mixed ester. If a purified product is desired, the esterified mixture may be treated to remove the catalyst, as with a solution of sodium carbonate when the catalyst used is sulfuric acid, and then submitted to fractional distillation. A good vacuum is applied after most of the low boiling materials have been removed. The choice of fraction to be retained as the mixed ester can be made from a knowledge of the boiling points of the materials used, and an analysis of the several fractions, especially for saponification number.

The method of preparation of benzyl ethyl phthalate is illustrative. Ethyl alcohol (35 parts by weight) and phthalic anhydride (107 parts) were warmed together, under a reflux condenser, for ½ hour. There was then added benzyl alcohol (78.5 parts) and benzol (60 parts). The mixture was again heated, an apparatus being so arranged that the vapors, which consisted mostly of benzol and water (the latter resulting from the esterification), rose through an air-cooled tube and then came down through a water-cooled condenser; the condenser liquid dropped into a separator from which the upper or benzol layer returned continuously to the reaction vessel and the lower, aqueous layer was withdrawn from a valve in the bottom. After 36 hours' heating with the continuous removal of the water as indicated, the reaction mixture was distilled at approximately 3 mm. pressure. The fraction boiling at 197° to 200° C. was crude ethyl benzyl phthalate. It was redistilled to give a purified fraction which boiled at 199° C., at a pressure of approximately 3 mm. of mercury. This was found by analysis to be ethyl benzyl phthalate.

As an alternative method of preparation, the product of the esterification, made as described above, may be neutralized with an aqueous solution of sodium carbonate and then washed with water before the first vacuum distillation. This preliminary purification decreases the rate of decomposition during the early stages of the distillation.

For the ethyl alcohol I may substitute another saturated aliphatic alcohol, such as methyl, propyl, normal butyl, or isoamyl. For the benzyl alcohol I may substitute another aromatic alcohol, as, for example, either tolyl or beta phenyl ethyl. Also, I may substitute for the phthalic acid some other polycarboxylic acid, as, for example, succinic acid, citric acid, or phenyl malonic acid.

Preferably, I use as the aliphatic alcohol one of boiling point below 150° C., in order to obtain properties of the final mixed ester, such as melting point and viscosity, most suitable for the use of the mixed ester as a solvent for pyroxylin. I avoid using an unsaturated aliphatic alcohol or an acid containing an unsaturated alkyl group, because of the greater stability of the saturated compounds.

In the case of a tricarboxylic acid, such as citric, I make either the dialkyl monoaryl or monoalkyl diaryl ester.

The several compounds of this class are compatible with pyroxylin. The solvent powers of most of them for pyroxylin is very great. Thus the phthalic acid esters of benzyl alcohol and an aliphatic alcohol that boils at 150° C. or lower are oily liquids that are more active solvents for pyroxylin than some of the plasticizers or softeners that have been used in lacquers.

The various compounds may be identified by saponifying and then testing for the alcohols and acid radical present. Thus, benzyl ethyl phthalate may be fractionated to distinguish it from a simple mixture of diethyl and dibenzyl phthalate and then saponified with a solution of sodium hydroxide to give ethyl alcohol (B. P. 78° C.), benzyl alcohol (B. P. 204° C.), and sodium phthalate, each of which may be identified by well known methods.

Compositions comprising pyroxylin and benzyl ethyl phthalate, which serves only as one example of my invention, are illustrated by the following formulas.

All proportions are by weight.

1. Dried lacquer film—
    Pyroxylin _____ 4 parts
    Benzyl ethyl phthalate_____ 1 part
2. Lacquer—
    Pyroxylin _____ 4 parts
    Benzyl ethyl phthalate_____ 1 part
    Butyl acetate _____ 15 parts
    Ethyl alcohol _____ 2 parts
    Toluol _____ 23 parts
3. Lacquer with resin—
    No. 2 formula_____ 45 parts
    Ester gum _____ 2 parts
4. Pigmented lacquer—
    No. 3 formula_____ 47 parts
    Zinc oxide _____ 4 parts Other ingredients that may be used in the formulas above, in a manner which will be evident to one skilled in the art, include, amyl acetate, ethyl acetate, benzol, petroleum naphtha, butyl alcohol, amyl alcohol, damar gum, shellac, Prussian blue, urea, and zinc acetate.

The term "acid which contains no unsaturated alkyl group," as used in the claims, is intended to cover acids in which there may be unsaturation in the aryl radical but not in the aliphatic residue or radical. Phenyl malonic acid is an example, there being no unsaturation except in the aryl (here the phenyl) group.

By the term "aryl" as used in the specifications and claims, I mean a radical that contains an unsaturated six-carbon ring, as, for example, benzyl, $C_6H_5.CH_2-$, or tolyl, $CH_3.C_6H_4.CH_2-$. I exclude, under this definition, radicals that contain no unsaturated six-carbon ring, as, for example, cyclohexyl, $C_6H_{11}-$, and hexahydrocresyl, $CH_3.C_6H_{10}-$.

I claim:—

1. A composition of matter comprising an aryl ethyl ester of a polycarboxylic acid which contains no unsaturated alkyl group.
2. A composition of matter comprising an aryl ethyl ester of a dicarboxylic acid which contains no unsaturated alkyl group.
3. A composition of matter comprising an aryl ethyl ester of a dicarboxylic aromatic acid.
4. A composition of matter comprising an aryl ethyl ester of phthalic acid.
5. A composition of matter comprising benzyl ethyl ortho-phthalate.
6. A composition of matter comprising an aryl ethyl ortho-phthalate.
7. Benzyl ethyl ortho-phthalate having a boiling point of 199° C. under an absolute pressure of approximately 3 mm. of mercury.

In testimony whereof I affix my signature.

R. H. VAN SCHAACK, JR.